June 24, 1930.  R. H. ROSENBERG  1,765,617
BUMPER BAR
Filed May 31, 1929
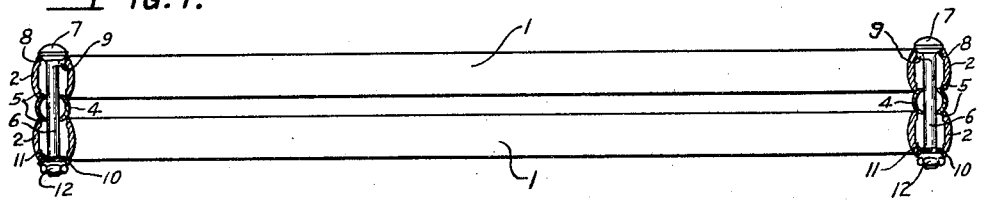
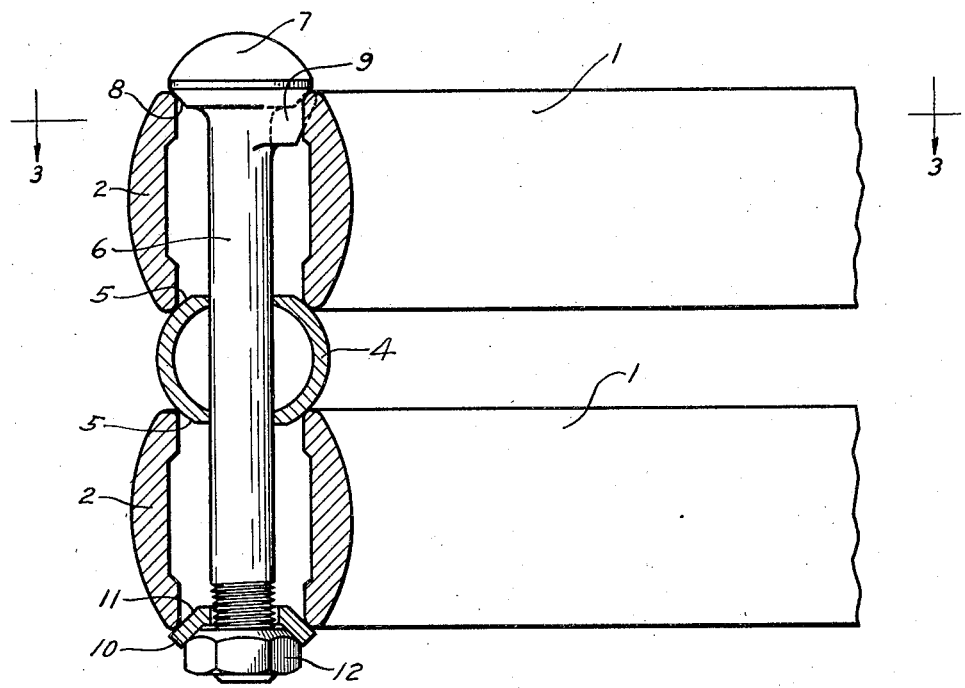
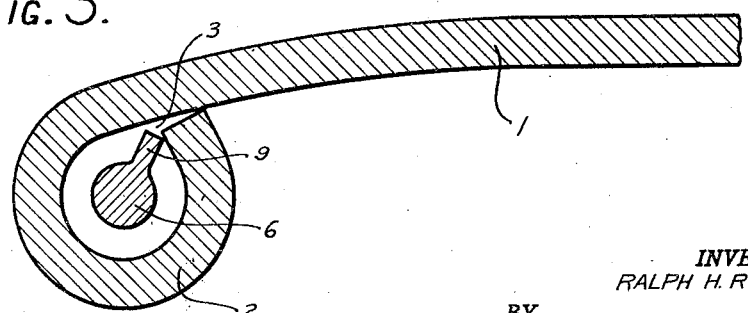
INVENTOR
RALPH H. ROSENBERG.
BY *Toulmin & Toulmin*
ATTORNEY Patented June 24, 1930

1,765,617

UNITED STATES PATENT OFFICE

RALPH H. ROSENBERG, OF SPRINGFIELD, OHIO, ASSIGNOR TO THE CENTRAL BRASS AND FIXTURE CO., OF SPRINGFIELD, OHIO, A CORPORATION OF OHIO

BUMPER BAR

Application filed May 31, 1929. Serial No. 367,172.

This invention relates to bumper bars, and more particularly to the means of assembling the ends of the bars.

It is the object of this invention to provide a neat, attractive and secure means for attaching the bars, said means consisting of eyes formed on the ends of each bar by winding or turning the ends to form eyes, each eye having an angular space therein for the purpose of receiving a key or projection on the bolt used for binding the parts of the bar together.

It is also the object of this invention to provide, in connection with bars of this kind, bolts with beveled heads and beveled washers, together with a barrel shaped spacer fitting within the eyes to form the complete end structure of the bar. Bars constructed and formed in this manner present ends neat and massive in appearance, while adapted to resist shocks and wear.

The keyed bolt fits into an angular space of the eye of the bumper bar to act as a lock, preventing the bolt from turning under the wrench when the bumper is being assembled; the spacers are beveled and therefore self-centering, while the bolt is beveled and therefore self-centering in the eye of the bumper.

These and other advantages will appear from the following description, taken in connection with the drawings.

Referring to the drawings:

Figure 1 is an elevation of the bar taken as a whole.

Figure 2 is a vertical section through the end of the bar showing the eyes, the spacer and the particular form of bolt for uniting the parts of the bar.

Figure 3 is a horizontal section of one end of the bar with the bolt in section, showing the key for preventing the turning of the bolt.

The bumper as a whole is composed of two separate bars, indicated by the numeral 1. Each separate bar is looped by winding each end into the form of an eye, indicated by the numeral 2. In the formation of each eye there is left an angular space 3 formed by the end of the bar contacting with another part of the bar.

For the purpose of holding the separate bars apart, there is provided a spacer 4, spherical or barrel-shaped, having beveled ends 5. Each end of the eye of the bar is large enough to receive either the spacer, the head of the bolt or a washer therein. The bolt is indicated by the numeral 6 and has on one end thereof a round head 7, with the beveled surface on the under side of the head indicated by the numeral 8.

Underneath the head and adjacent the beveled part thereof is a lug or projection 9 adapted to fit within the angular space 3 to prevent the turning of the bolt. The end of the bolt, opposite the head 7, is screw threaded and has thereon a dish-shaped washer 10. This washer has a beveled face 11 which engages one of the ends of the eye. Fitting over the end of the bolt is a nut 12 which engages the washer 10, and forces the washer and the head of the bolt into the engagement with the eyes for the purpose of holding the parts of the bar in assembled condition.

The relation of the parts as assembled is fully shown in Figure 2. When the bumper is thus assembled it presents a neat appearance, with rather large massive eyes, which are more or less attractive in appearance, and for the purpose of adding attractiveness the eyes on each end of the bar are oval in shape, thereby adding to the attractiveness and resisting qualities of the ends of the bars. There is thus provided a bumper composed of few parts, easily assembled and readily disassembled, and when assembled is rigid and well adapted to resist heavy wear as well as heavy bumps and knocks.

I desire to comprehend within my invention such modifications as may be clearly embraced within my claims and the scope of my invention.

Having thus fully described my invention, what I claim as new and desire to secure by Letters Patent, is:

1. In a bumper, a pair of bars, each having its ends turned and formed into large, massive oval-shaped eyes, and means to unite each end of one bar to an end of the other bar and hold the bars in spaced relation to each other.

2. In a bumper, a pair of bars, each having its ends turned and formed into large, massive oval-shaped eyes, and means to unite each end of one bar to an end of the other bar and hold the bars in spaced relation to each other, said means consisting of spherical spacers and round headed bolts passing through the eyes and the spacers.

3. In a bumper, a pair of bars, each having its ends turned and formed into large, massive oval-shaped eyes, and means to unite each end of one bar to an end of the other bar and hold the bars in spaced relation to each other, said means consisting of a pair of round headed bolts passing through said eyes, and a spacer for each bolt, the head of said bolt forming a curve continuous with the curve of the oval-shaped eye.

4. In a bumper, a pair of bars, each having its ends turned and formed into large, massive oval-shaped eyes, and means to unite each end of one bar to an end of the other bar and hold said bars in spaced relation to each other, said means consisting of a pair of bolts passing through said eyes, and a spherical-shaped spacer for each bolt.

5. In a bumper, a pair of bars, each having its ends turned and formed into large, massive oval-shaped eyes with angular spaces therein, and means to unite each end of one bar to an end of the other bar and hold said bars in spaced relation to each other, said means consisting of a pair of round headed bolts having lugs thereon fitting within said angular spaces and a spacer for each bolt.

6. In a bumper, a pair of bars, each having its ends turned and formed into massive oval-shaped eyes with angular spaces therein, one bar being placed above the other with its eyes in line with the eyes of the other, spherical spacers fitting within said eyes and between the bars, and bolts passing through said eyes and spacers to hold the bars in spaced relation to each other, each bolt having a lug projecting into an angular space to prevent the bolt from turning.

7. In a bumper, a pair of bars, each having a relatively large, massive eye on each end, said bars being superimposed one above the other with each eye of one bar in line with an eye of the other bar, barrel-shaped spacer members fitting within said eyes and between said bars, a bolt passing through the eyes on one end of each bar, the head of said bolt being beveled to securely seat within said eye, and coacting means on said eye and head to prevent the turning of said bolt.

8. In a bumper, a pair of bars, each bar having on one end a large, massive eye, said eyes being in line with each other, a spherical spacer between said bars and fitting within said eyes, a bevel headed bolt extending through said eyes and spacer with the beveled part of said head engaging one eye, and bevel means on said bolt engaging the other eye whereby the eyes are clamped against the spacer and the bars held in spaced relation to each other.

9. In a bumper, a pair of bars, each bar having on one end a large, massive eye, said eyes being in line with each other, a spherical spacer between said bars and fitting within said eyes, a bevel headed bolt extending through said eyes and spacer with the bevel part of said head engaging one eye, a beveled washer and cooperating nut on said bolt engaging the other eye whereby the eyes are clamped against the spacer, and cooperating means on the head and one eye to prevent the bolt from turning.

10. In an eye and bolt construction, a pair of spaced eyes, a spacer between said eyes having beveled surfaces fitting within said eyes, and a bolt extending through said eyes and spacer, said bolt having a bevel head on one end to engage one eye and a bevel clamping means on the other end to engage the other eye for clamping the eyes and spacer together.

11. In an eye and bolt construction, a pair of oval-shaped spaced eyes, an oval-shaped spacer between said eyes, said spacer having beveled parts fitting within said eyes, a bolt extending through said eyes and spacer, said bolt having a bevel head on one end to engage one eye and a bevel clamping means on the other end to engage the other eye for clamping the eyes and spacer together, and interengaging means on said head and eyes to prevent the turning of said bolt.

12. In an eye and bolt construction, a plurality of eyes having angular spaces in one side thereof, spacing means for said eyes having beveled parts extending into said eyes, and a clamp bolt extending through said eyes and spacing means for clamping and holding the eyes and spacing means in alignment, said bolt having bevel means on each end to engage within said eyes, and a lug on one end to engage an angular space to prevent the turning of the bolt.

13. In an eye and bolt construction, a plurality of oval-shaped eyes having angular spaces therein, spherical spacing means for said eyes having beveled parts extending into said eyes, and a clamp bolt extending through said eyes and spacing means for clamping and holding the eyes and spacing means in alignment, said bolt having bevel means on each end to engage within said eyes and a lug on one end to engage an angular space in one eye to prevent said bolt from turning.

14. In an eye and bolt construction, a pair of oval-shaped eyes, a spherical-shaped spacer between said eyes, said spacer having beveled parts fitting within said eyes, clamping means extending through said eyes and spacer, said clamping means having a large bevel-faced eye engaging part on each end, and means on said clamping means in engagement with an eye to prevent the turning of said clamping means.

In testimony whereof, I affix my signature.

RALPH H. ROSENBERG.